United States Patent
Klein et al.

(10) Patent No.: US 10,940,667 B2
(45) Date of Patent: Mar. 9, 2021

(54) BIAXIALLY ORIENTED MATT POLYESTER FILM WITH INCREASED COEFFICIENT OF FRICTION

(71) Applicant: Mitsubishi Polyester Film GmbH, Wiesbaden (DE)

(72) Inventors: Dagmar Klein, Ockenheim (DE); Matthias Konrad, Kriftel (DE); Holger Kliesch, Ginsheim (DE); Artur Michalski, Gau-Algesheim (DE); Viktor Fischer, Oftersheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 127 days.

(21) Appl. No.: 16/406,347

(22) Filed: May 8, 2019

(65) Prior Publication Data

US 2019/0344530 A1    Nov. 14, 2019

(30) Foreign Application Priority Data

May 14, 2018    (DE) ...................... 10 2018 207 429.1

(51) Int. Cl.
| | | |
|---|---|---|
| *B32B 27/36* | (2006.01) | |
| *B32B 5/16* | (2006.01) | |
| *B32B 27/40* | (2006.01) | |

(52) U.S. Cl.
CPC ............ *B32B 5/16* (2013.01); *B32B 27/36* (2013.01); *B32B 27/40* (2013.01); *B32B 2255/26* (2013.01); *B32B 2264/0292* (2013.01); *B32B 2264/102* (2013.01); *B32B 2307/408* (2013.01); *B32B 2307/518* (2013.01); *B32B 2439/46* (2013.01); *B32B 2597/00* (2013.01)

(58) Field of Classification Search
CPC .......... B32B 2250/244; B32B 2255/10; B32B 2255/26; B32B 2264/0292; B32B 2264/102; B32B 2272/00; B32B 2307/408; B32B 2307/50; B32B 2307/518; B32B 2307/538; B32B 2439/46; B32B 2597/00; B32B 27/36; B32B 27/40; B32B 5/16; C08J 2367/02; C08J 2475/04; C08J 7/0427
See application file for complete search history.

(56) References Cited

FOREIGN PATENT DOCUMENTS

| | | |
|---|---|---|
| EP | 0678378 A1 | 10/1995 |
| EP | 0779326 A1 | 6/1997 |
| EP | 0903221 A2 | 3/1999 |
| EP | 0976548 A2 | 2/2002 |
| EP | 1442875 A1 | 8/2004 |
| EP | 2321361 A2 | 5/2011 |
| WO | 200153091 A1 | 7/2001 |
| WO | 2010015494 A2 | 2/2010 |

OTHER PUBLICATIONS

Carson, Dr. Terri, et al., "Inherent Matte Polyurethane Dispersions as Matting Agents," May 21, 2014, URL: http://www.abrafati2017.com.br/2015/Dados/PDF/Paper_139.pdf
Dimmers, Markus et al., "Wässrigen Lacksysteme // Matte Polyurethandispersionen," Nov. 1, 2015, URL: http://www.alberdingk-boley.de/fileadmin/documents/Presseberichte/2015-11_FL_11_2015_Dimmers.pdf English machine translation.
European Search Report in corresponding European Patent Application No. 19172925.0.

*Primary Examiner* — Lawrence D Ferguson
(74) *Attorney, Agent, or Firm* — ProPat, LLC; Cathy R. Moore

(57) ABSTRACT

The present invention relates to an at least two-layer biaxially oriented polyester film with at least one matt surface and with an increased coefficient of friction of this surface, with a total thickness from 8 to 75 µm. The film of the invention has excellent suitability as an external ply of animal-feed bags with matt appearance which on stacking are not subject to slippage between the same.

16 Claims, No Drawings

BIAXIALLY ORIENTED MATT POLYESTER FILM WITH INCREASED COEFFICIENT OF FRICTION

CROSS-REFERENCE TO RELATED APPLICATIONS

This application claims priority to German Patent Application 2018 207 429.1 filed May 14, 2018, which is hereby incorporated by reference herein in its entirety.

FIELD OF THE INVENTION

At least two-layer biaxially oriented polyester film with at least one matt side and with increased coefficient of friction of the matt side, and also process for its production, and use of the said film in packaging, for example for animal-feed bags.

The present invention relates to an at least two-layer biaxially oriented polyester film with at least one matt surface and with increased coefficient of friction of this surface, with total thickness from 8 to 75 µm. The film of the invention has excellent suitability for the use as external ply of animal-feed bags with matt appearance which on stacking are not subject to slippage between the same.

BACKGROUND OF THE INVENTION

For design reasons, many packaging applications use transparent films with matt appearance in the external ply of a packaging composite. The filled packs must be stackable, and must exhibit no slippage during transport. This also applies to bag packaging, in particular by way of example to large animal-feed bags. The external side of the packaging composite must therefore have increased coefficient of friction. The bag must moreover have mechanical strength which can withstand the load arising from the contents, with no deformation in the packaging, and the entire packaging structure must be cost-efficient in its design and ease of production. The film must moreover have good printability, and the appearance of colour must be clear and crisp.

Films with matt surface and with increased coefficient of friction are known in the prior art: by way of example, EP0678378 describes a multilayer polyethylene film with gloss not above 50 and with coefficient of static friction not below 0.5, and coefficient of dynamic friction not above 0.5. However, use of polyethylene films reduces mechanical strength of the packaging, and an additional ply consisting of a polyester film is therefore required in the interior of the packaging composite in order to permit production of a sufficiently stable animal-feed bag. The heat resistance of PE films is moreover low, and this by way of example restricts the maximal temperature to about 100° C. when this type of film is used for sealing. If higher temperatures were to be used and the said film were to be used as matt external ply in a bag, it would stick to the sealing jaw during sealing and, for example, if sealed in a fold with overlap would also seal to itself; this is undesirable. The lower the maximal contact temperature between, for example, a sealing jaw and the film surface, the longer the sealing cycle that is necessary in order to provide sufficient heating of the sealable material in the interior of the bag to permit sealing as desired. This leads to significantly reduced profitability in bag production.

EP 1442875 describes a polyester film with matt surface. However, by virtue of the particles used polyester films with matt surface have good slip, i.e. low coefficient of friction. The combination of matt film surface with high coefficient of friction therefore represents a contradiction. A film as described in EP 1442875 is therefore unsuitable for use as external ply for a bag with good stackability and low susceptibility to slippage.

EP 0903221 describes a polyester film with good optical properties, good processability and good oxygen barrier after coating with a metallic or oxidic material. Those properties are achieved through use of a particle system which produces a defined number of elevations with defined height and diameter on the side to be coated. These films likewise have an increased coefficient of friction, but the film structure of the invention gives the film high gloss, which is unsuitable for the application described here.

SUMMARY OF ADVANTAGEOUS EMBODIMENTS OF THE INVENTION

The object of the present invention was therefore to provide a polyester film which is matt on at least one side and has an increased coefficient of friction (COF) of the matt side and has adequate mechanical strength. The film is moreover intended to withstand contact temperature of 180° C. for at least 1 second without sticking to a metal sealing jaw and/or sealing to itself.

DETAILED DESCRIPTION OF ADVANTAGEOUS EMBODIMENTS OF THE INVENTION

The foregoing object is achieved via an at least two-layer biaxially oriented polyester film equipped with a polyurethane-based coating on at least one film surface, characterized in that
(a) the total film thickness is from 8 to 75 µm,
(b) an outer layer (A) comprises particles with $d_{50}$ from 2.0 µm to 10 µm, this outer layer (A) then being a matt outer layer (A),
(c) the polyurethane-based coating is the product of drying of an aqueous dispersion, where:
 (i) the aqueous coating dispersion is applied to the matt outer layer (A),
 (ii) the aqueous coating dispersion comprises spherical particles with average particle size 0.6 µm,
 (iii) the dry layer thickness of the coating is from 20 nm to 250 nm.
This polyester film then has the following properties:
(a) gloss at 60° of the coated matt outer layer (A) of at most 50 and at least 10,
(b) coefficient of friction (COF) of the coated matt outer layer (A) of from 0.4 to 1.6,
(c) haze below 60%,
(d) volume haze below 40%,
(e) modulus of elasticity above 3000 N/mm$^2$,
(f) F5 value above 80 N/mm$^2$ and
(g) by virtue of the matt outer layer (A), up to at least 180° C. the matt film side does not seal on contact to itself (matt on matt).

When hereinafter mention is made of values that are too small, too low, too high and/or poor, this means values which are outside of the corresponding ranges of the invention. When hereinafter mention is made of values that are good or very good, this means values which are within the ranges and, respectively, preferred ranges of the invention (in so far as these values are quantifiable or for the purposes of the description have been quantified).

The total film thickness is at least 8 µm and at most 75 µm. The film thickness is preferably at least 10 µm and at most 30 µm, and particularly preferably at least 11 µm and at most 23 µm. If the total film thickness is below 8 µm, stiffness is insufficient to ensure adequate dimensional stability of the packaging; above 75 µm, no further advantages are achieved in relation to gloss, friction behaviour and mechanical strength, and production of the packaging is too expensive.

In one embodiment, the film has a three-layer structure, and has the matt outer layer (A) of the invention on one side of the layer (B) (=base layer), and has a further outer layer (C) on the other side of the layer (B). In this case, the two layers (A) and (C) form the outer layers (A) and (C). A three-layer structure can give a film with low haze and good transparency in that the layer (B) comprises no particles other than those introduced via addition of self-regrind (see below). It is thus possible to increase the proportion of regrind returned; this leads to particularly cost-effective film production. The proportion of the base layer, based on the total film thickness, is at least 60%, preferably 70% and particularly preferably at least 75%.

For environmental protection purposes, films can advantageously be recycled and used during film production or in other polyester-containing products. In one embodiment, the film residues are reclaimed and can be introduced into the layer (B) (self-regrind). The proportion of the recycled polyester material returned here can be maximized without impairing the film properties described of the invention. The proportion of recycled polyester material can be from 0 to 60% by weight, preferably from 2 to 50% by weight and particularly preferably from 5 to 40% by weight, based on the total weight of the film.

The thickness of the matt outer layer (A) is at least 0.7 µm and at most 2.0 µm, preferably at least 0.8 µm and at most 1.8 µm and particularly preferably at least 0.9 µm and at most 1.5 µm, the thickness of the matt outer layer (A) and of the outer layer (C) here being identical or different. If the outer layers are too thick, the requirements placed upon the haze of, and the appearance of colour of, the film are no longer met; if the outer layer A is thinner than 0.7 µm, the gloss values of the invention are not achieved. The appearance of colour of the film is measured in terms of the volume haze and the perceived quality of the printed image viewed through the film.

In another embodiment, the film has a two-layer structure. In a two-layer structure, the non-matt outer layer corresponds to the base layer (B) of the three-layer embodiment, and is subject to the same requirements relating to particle content and to the proportion of the total film thickness. The matt outer layer here corresponds to the matt outer layer (A) of the three-layer embodiment and has a structure that is (physically and chemically) analogous to that of the matt outer layer (A) of the three-layer embodiment.

When hereinafter mention is made of the outer layer (A), this term refers either to the two-layer embodiment or to an embodiment having a greater number of layers.

The polyester film of the invention has, on the matt outer layer (A), a coating which is applied from aqueous dispersion and which comprises spherical particles that are either self-stabilized or stabilized by addition of one or more surfactants. The surfactants here can be anionic, cationic or nonionic, or else can be protective-colloid polymers. Suitable surfactants are sodium dodecyl sulfate, cetyltrimethylammonium chloride (CTML CL), sodium and/or potassium salts of fatty acids, alkyl ethoxylates (linear and branched), polyglycerol polyricinoleate, polysorbates and ethoxylated sorbitan fatty acid esters (e.g. polyoxyethylene (20) sorbitan monooleate) and sorbitan fatty acid esters (e.g. sorbitan monooleate), polyethylene glycol (Mw=from 100 to 10 000 g/mol), polyols such as polyether polyols (e.g. polytetrahydrofuran), polyalkylene glycol ethers and block copolymers such as poly(ethylene glycol)-block-poly(propylene glycol)-block-poly(ethylene glycol) (PEG-PPG-PEG). Particular preference is given to linear ethoxylated alcohols (C10-C16). According to the invention, the particles consist of nonionic polyurethanes, anionic polyurethanes or a mixture thereof. It is moreover also possible to use copolymers of anionic and nonionic polyurethanes. The average particle diameter of the spherical particles is ≥0.6 µm and preferably ≥1.0 µm. If the particle size is below 0.6 µm, it is impossible to achieve the desired gloss.

In a preferred embodiment, the polyurethane coating comprises
(1) spherical particles with average particle size 0.6 µm, these particles comprising at least one anionic polyurethane which is formed by the reaction of at least one
  (1a) anionic prepolymer having from 5 to 25 meq/100 g dry-matter content of carboxy groups with at least one
  (1b) chain extender selected from diamine sulfonate salts having one or more sulfonic acid groups.

This type of dispersion is described by way of example in EP 2321361, and is by way of example obtainable commercially from Lamberti S.p.A. as ESACOTE® PU900. When the coating is applied in the thicknesses of the invention to the outer layer (A) of the invention, the surprising result is reduced gloss of the coated film surface and, at the same time, increased coefficient of friction, even in the case of very thin coatings. The dry thickness of the coating on the finished film is in each case at least 20 nm, preferably at least 30 nm and in particular at least 50 nm, and is at most 250 nm, preferably at most 200 nm and ideally at most 150 nm. An ideal increase of the coefficient of friction of the matt side is thus achieved, with no impairment of the processability of the film on high-speed packaging machines (i.e. by way of example within the stated thickness range the film does not seal to itself). If the coating thickness is below 20 nm, it is impossible to achieve the desired increase of coefficient of friction; if the coating thickness is above 250 nm, successful processing during the production of packaging bags is no longer ensured. The polyurethane dispersions described in EP 2321361 are typically used to achieve what is known as soft-feel (or soft-touch) effect, which provides particularly soft haptic properties/surface to the surface treated with the coating. However, when such coatings are applied in the thicknesses of the invention to the matt outer layer (A) of the invention, the surprising result is an increase of the coefficient of friction of the matt polyester film, which otherwise has low coefficient of sliding friction (when it is not coated with the PU coating of the invention).

The polyurethane dispersion of the invention can moreover comprise a proportion of 2.0% by weight of a crosslinking agent, based on the solids content of the dispersion. Suitable crosslinking agents here are oxazoline-based crosslinking agents such as EPOCROS® WS700 from Sumitomo, or silane-based crosslinking agents such as GENOSIL® GF56 from Wacker Chemie AG. Addition of the stated quantities of the crosslinking agent improves the abrasion resistance of the polyurethane coating; this has proved to be advantageous particularly in the case of packaging that is subject to frequent transport and/or loading/unloading, and in the case of storage for a long period. In contrast, addition of more than 2.0% by weight of crosslinking agent has an adverse effect on the increase of the coefficient of friction. Addition of crosslinking agent moreover reduces the susceptibility of the film to sealing to itself.

For use of the polyester film of the invention in packaging intended to come into contact with foods, it has proved to be advantageous that the coating dispersion and all other components that may be added (e.g. crosslinking agent) are listed in Regulation EU/10/2011 (Annex I, Table 1). After the drying procedure (and the heat-setting procedure), the coating herein should comprise the migration limits listed in EU/10/2011. If substances and/or solvents are comprised which are not listed in EU/10/2011 (Annex I, Table 1), or exhibit very low migration limits; it has therefore proved to be advantageous to use the substances in a manner such that during the heat-setting procedure they either evaporate or decompose or undergo chemical reaction (e.g. crosslinking or covalent bonding to the polyester surface and/or to the polymer of the coating), so that migration (at the coated surface) is not measurable or is below the detection limit of the measurement method used; (the migration limit for substances not mentioned in EU/10/2011 which are not CMR substances is 10 ppb).

According to the invention, the matt outer layer (A) comprises a quantity of from 2% by weight to 7% by weight, preferably from 2.5% by weight to 6.5% by weight and particularly preferably from 3% by weight to 6% by weight, of silicon dioxide particles, based on the mass of the outer layer A. Below 2% by weight, it is impossible to achieve the gloss value according to the invention after application of the coating; above 7% by weight, the haze of the film becomes too high. It is preferable to use synthetic $SiO_2$ particles (in colloidal form), of the type described in EP 1442875. These particles become very successfully bonded into the polymer matrix, and produce only little haze. The diameter $d_{50}$ of the particles is from 2.0 to 10 µm, preferably from 3.2 to 9 µm and particularly preferably from 3.4 to 8 µm. If particles with diameter below 3.0 µm are used, the result (with comparable gloss values) is increased haze. Particles with diameter above 10 µm generally cause filter problems. Examples of producers of these particles are Grace (USA), Fuji (Japan), Degussa (Germany) and Ineos (UK).

In one embodiment, in which the film has a three-layer structure, the outer layer (C) situated on the other side of the layer (B) likewise comprises particles, the aim here being to ensure good winding behaviour of the film. It is possible that the particles present in the outer layer (C) are the same as those present in the outer layer (A). A preferred embodiment uses a quantity of from 500 to 4000 ppm of particles with diameter $d_{50}$ from 2.0 to 5 µm, because this leads to lower haze of the film.

The total quantity of particles, based on the total weight of the film, is at most 1.95% by weight, preferably 1.8% by weight and particularly preferably 1.65% by weight. As particle content increases, haze and volume haze increase and film transparency decreases; this adversely affects the appearance of colour on the printed image of the packaging.

For the purposes of the invention, the film comprises less than 0.3% by weight, preferably less than 0.1% by weight, and particularly preferably none at all (0% by weight) of whitening polymers incompatible with the main polyester constituent, for example polypropylene, COCs, polyethylene, polystyrene, etc., and of whitening particles such as titanium dioxide and barium sulfate, because these lead to significantly increased haze and to reduced transparency.

The film can comprise particles other than the silicon dioxide of the invention, for example: calcium carbonate or aluminium trioxide, the content of these particles preferably being <0.3% by weight, particularly preferably being <0.25% by weight, and in particular being below 0.01% by weight, based on the total weight of the film. Particles other than the preferred silicon dioxide lead to reduced transparency and increased haze, without a possibility of achieving any further reduction of gloss values. The film can moreover comprise particles deriving from the catalyst used during the production of the polyester, and also inorganic salts, for example magnesium salts or zinc salts, which serve to adjust the melt conductivity of the polymer.

The base layer (B) and the other layers of the film preferably comprise at least 80% by weight of thermoplastic polyester, in particular at least 90% by weight of thermoplastic polyester, based on the total weight of the respective layer. Materials suitable for this purpose are polyesters made of ethylene glycol and terephthalic acid (=polyethylene terephthalate, PET), made of ethylene glycol and naphthalene-2,6-dicarboxylic acid (=polyethylene 2,6-naphthalate, PEN), made of 1,4-bishydroxymethylcyclohexane and terephthalic acid (=poly-1,4-cyclohexanedimethylene terephthalate, PCDT), and also made of ethylene glycol, naphthalene-2,6-dicarboxylic acid and biphenyl-4,4'-dicarboxylic acid (=polyethylene 2,6-naphthalate bibenzoate, PENBB). Preference is given to polyesters which comprise ethylene units and which—based on the dicarboxylate units—consist of at least 90 mol %, particularly preferably at least 95 mol % of terephthalate units or 2,6-naphthalate units. The remaining monomer units derive from other aliphatic, cycloaliphatic or aromatic dicarboxylic acids and, respectively, diols. It is also advantageously possible that the base layer (B) uses copolymers and/or mixtures and/or blends made of the abovementioned homo- and/or copolymers; (in the data for the quantities of the dicarboxylic acids, the total quantity of all of the dicarboxylic acids is 100 mol %; analogously, the total quantity of all of the diols is also 100 mol %).

Suitable other aromatic dicarboxylic acids preferred are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid), stilbene-x,x'-dicarboxylic acids and furandicarboxylic acid. Among the cycloaliphatic dicarboxylic acids, mention may be made of cyclohexanedicarboxylic acids (in particular cyclohexane-1,4-dicarboxylic acid). Among the aliphatic dicarboxylic acids, the ($C_3$-$C_{19}$) alkanediacids are particularly suitable, where the alkane moiety can be straight-chain or branched.

Examples of suitable other aliphatic diols are diethylene glycol, triethylene glycol, aliphatic glycols of the general formula HO—$(CH_2)_n$—OH, where n is an integer from 3 to 6 (in particular propane-1,3-diol, butane-1,4-diol, pentane-1,5-diol and hexane-1,6-diol) and branched aliphatic glycols having up to 6 carbon atoms, and cycloaliphatic, optionally heteroatom-containing diols having one or more rings. Among the cycloaliphatic diols, mention may be made of cyclohexanediols (in particular cyclohexane-1,4-diol). Suitable other aromatic diols have by way of example the formula HO—$C_6H_4$—X—$C_6H_4$—OH, where X is —$CH_2$—, —$C(CH_3)_2$—, —$C(CF_3)_2$—, —O—, —S— or —$SO_2$—. In addition to the above, bisphenols of the formula HO—$C_6H_4$—$C_6H_4$—OH are also suitable.

The base layer (B) is particularly advantageously comprised of a copolyester whose dicarboxylic acid components derive from terephthalic-acid-derived units and from a small quantity (<5 mol %) of isophthalic-acid-derived units. In this case, the film is particularly easy to produce and has particularly good optical properties. The base layer (B) then in essence comprises a polyester copolymer comprised mainly of terephthalic acid and isophthalic acid units and of ethylene glycol units (>97 mol % of diol units).

In a preferred embodiment, the matt outer layer (A) comprises from 4 to 30 mol % of isophthalic acid (IPA), preferably from 6 to 20 mol % of isophthalic acid, and particularly preferably from 8 to 12 mol % of isophthalic acid, based on the total quantity of acid in the polyester in the said layer. This significantly reduces the volume haze of the film of the invention. This is advantageous for the applications that are printed on the side of the outer layer (C) (e.g. animal-feed bags) and that, for design-related reasons, require a clear appearance of the ink colours through the film. If the proportion of IPA used is less than 4 mol %, the reduction of volume haze is not significant. As the proportion of IPA increases, the matt layer becomes more susceptible to sealing on contact with itself. Use of a proportion of more than 30 mol % of IPA adversely affects the processing properties of the film, because the outer layer (A) becomes susceptible to sticking on hot machine parts.

The polyesters can be produced by the transesterification process. This starts from dicarboxylic esters and diols, which are reacted with use of the usual transesterification catalysts, for example salts of zinc, of calcium, of lithium and of manganese. The intermediate products are then generally polycondensed in the presence of well-known polycondensation catalysts, for example antimony trioxide, titanium oxide, or esters, or else germanium compounds. The production procedure can use the direct esterification process equally well in the presence of polycondensation catalysts. This proceeds directly from the dicarboxylic acids and the diols.

It has been found particularly advantageous to polycondense the intermediate products in the presence of titanium dioxide or of germanium compounds, or to carry out the direct esterification process in the presence of polycondensation catalysts such as titanium dioxide or germanium compounds. The resultant biaxially oriented polyester film is therefore antimony-free, or at least has low antimony content. In the particularly preferred case, a desirable biaxially oriented polyester film comprises no antimony and can therefore be used in packaging applications in which the film is in direct contact with food.

The gloss measured at 60° of the matt and coated outer layer (A) of the film of the invention (for method see test methods) is at most 50 and at least 10, preferably at most 45 and at least 15, and particularly preferably at most 40 and at least 20. The gloss described is achieved through the use of the particles of the invention and of the applied coating, and also by virtue of the suitable polymers and the process below. A gloss value below 10 for the film would require the presence of significantly more particles in the outer layer; this would lead to poorer haze and reduced transparency of the film, and/or the coating would have to be thicker, with resultant poorer processing of the film in the process for production of the packaging. Excessively high gloss does not meet the optical requirements placed upon the desired design of the bag packaging, and the packaging is regarded as having lower quality.

The coefficient of friction (COF) of the invention for the coated outer layer (A) of the film is from 0.4 to 1.6, preferably from 0.5 to 1.5 and particularly preferably from 0.55 to 1.2. These COF values of the invention are usually not achievable in combination with the use of the particles described in the outer layer (A), because by virtue of the particles in the surface a matt film has low coefficient of sliding friction, i.e. low COF values. The COF values of the invention and the gloss value of the invention for the outer layer (A) are achieved by applying the coating of the invention to the outer layer (A).

The volume haze of the film of the invention is below 40%, preferably below 35% and particularly preferably below 30%. This volume haze is achieved through use of the polymers of the invention, preferably use of a polymer comprising from 4 to 30 mol % of isophthalic acid.

The haze of the invention is achieved through the selection of the particles and the particle content, inclusive of the distribution of particles across the layers, and also by virtue of the suitable polymers and the production process described below.

The modulus of elasticity of the film of the invention in both film directions moreover is >3000 N/mm$^2$ and preferably >3200 N/mm$^2$, and particularly preferably (in at least one film direction) >3400 N/mm$^2$. The F5 values (force at 5% tensile strain) are preferably above 80 N/mm$^2$. These mechanical properties can be set and maintained by varying the parameters of the biaxial stretching of the film in the context of the stated production process. When the film with these mechanical properties of the invention is processed into the packaging, the latter obtains the necessary stiffness that by way of example is necessary for large animal-feed bags.

According to the invention, no FIN sealing occurs at temperatures ≥180° C., preferably ≥190° C. and particularly preferably ≥210° C.; (Fin sealing meaning typically sealing to itself, i.e. sealing of the coated outer layer (A) to the coated outer layer (A)). At the stated temperatures, the seal seam strength of the film is not permitted to exceed 0.5 N/15 mm, i.e. no sealing of the film is permitted. This property can be achieved by complying with the polymeric composition of the invention for the outer layer (A) and complying with the coating thicknesses of the invention.

Production Process

The polyesters of the individual layers are produced by polycondensation, either starting from dicarboxylic acids and diol or else starting from the esters of the dicarboxylic acids, preferably the dimethyl esters, and diol. SV values of polyesters that can be used are preferably in the range from 500 to 1300; the individual values here are of relatively little importance, but the average SV value of the polymers used should be greater than 700 and preferably greater than 750.

The particles can be added before production of the polyester concludes. For this, the particles are dispersed in the diol, optionally ground, decanted and/or filtered and added to the reactor, either in the (trans)esterification step or in the polycondensation step. In a preferred method, a concentrated, particle-containing or additive-containing polyester masterbatch is produced in a twin-screw extruder, and is diluted with particle-free polyester during film extrusion. It has been found to be advantageous here to avoid using masterbatches comprising less than 30% by weight of polyester. In particular, the masterbatch comprising SiO$_2$ particles should not comprise more than 20% by weight of SiO$_2$ (because of the risk of gelling). In another possible method, particles and additives are added directly during film extrusion in a twin-screw extruder.

When single-screw extruders are used, it has been found to be advantageous to pre-dry the polyesters. When a twin-screw extruder with vent zone is used, the drying step can be omitted.

The polyester of the individual layers is first compressed and plastified in extruders. The melt(s) is/are then shaped in a single- or multilayer die to give flat melt films, forced through a flat-film die, and drawn off on a chill roll and one or more take-off rolls, whereupon the film cools and solidifies.

The film of the invention is biaxially oriented, i.e. biaxially stretched. The biaxial stretching of the film is most frequently carried out sequentially. In this case, it is first stretched longitudinally (i.e. in machine direction=MD) and then is stretched in transverse direction (i.e. perpendicularly to machine direction=TD). The longitudinal stretching can be carried out with the aid of two rolls running at different speeds corresponding to the desired stretching ratio. For transverse stretching, an appropriate tenter frame is generally used.

The temperature at which stretching is carried out can vary relatively widely, and depends on the desired properties of the film. The longitudinal stretching is generally carried out in the temperature range from 80 to 135° C. (heating temperatures from 80 to 135° C.), and the transverse stretching is generally carried out in the temperature range from 90° C. (beginning of stretching) to 140° C. (end of stretching). The longitudinal stretching ratio is in the range from 2.5:1 to 4.5:1, preferably from 2.8:1 to 4.3:1. A stretching ratio above 4.5:1 leads to significantly impaired ease of production (break-offs). The transverse stretching ratio is generally in the range from 2.5:1 to 4.8:1, preferably from 3.2:1 to 4.0:1. A transverse stretching ratio higher than 4.8:1 leads to significantly impaired ease of production (break-offs), and should therefore preferably be avoided. In order to achieve the desired film properties, it has proved advantageous that the stretching temperature (in MD and TD) is below 135° C. and preferably below 130° C. Before transverse stretching, one or both surfaces of the film can be coated. In one embodiment, the film has been coated on both sides, but this leads to an undesired cost increase. In a preferred embodiment, the film has been single-side-coated on the matt surface with a coating to increase the coefficient of friction (PU-based coating).

In one embodiment, this polyurethane (PU)-based coating dispersion is applied in-line during the process for the production of the biaxially oriented polyester film. The coating here is applied on one or both sides after longitudinal stretching and before transverse stretching. In order to achieve good wetting of the polyester film by the aqueous coating, it is preferable that the film surface is first corona-treated. The coating can be applied by a familiar suitable process, for example using a slot coater or a spray method. Particular preference is given to application of the coating by means of the "reverse gravure-roll coating" process, which can achieve extremely homogeneous application of the coating. Preference is likewise given to application by the Meyer rod process, which can achieve relatively thick coatings. Drying of the coating components can take place during the drying and stretching of the polyester film, and particularly during the subsequent heat-treatment, which can reach temperatures up to 240° C.

The in-line process here is economically attractive because the coating(s) can be applied in the context of the film-production process, and it is therefore possible to avoid an additional coating process step (e.g. off-line process).

In the heat-setting that follows, the film is kept at a temperature of from 150 to 250° C. under tension for a period of about 0.1 to 10 s and, in order to achieve the preferred shrinkage and elongation values, is relaxed in transverse direction by at least 1%, preferably at least 3% and particularly preferably at least 4%. This relaxation preferably takes place in the temperature range from 150 to 190° C. In order to reduce transparency bow, the temperature in the first setting field is preferably below 230° C., and particularly preferably below 220° C. It is moreover preferable that, for the same reason, at least 1%, preferably at least 2% of the overall transverse stretching ratio relates to the first setting zone, where no further stretching usually occurs. The film is then wound up in a conventional manner.

In a particularly cost-effective method of producing the polyester film, a quantity of up to 60% by weight, based on the total weight of the film, of offcut material (regrind) can be introduced into the extrusion procedure for the formation of the base layer (B), without any significant resultant adverse effect on the physical properties of the film.

The film of the invention has excellent suitability for the production of film bags, in particular of large stackable animal-feed bags. The film of the invention is usually printed herein on the side opposite to the matt side, and then adhesive-bonded by means of commercially available lamination adhesive either to an aluminium foil (thickness usually from 7 to 12 μm) or to a metallized polyester film (thickness usually 12 μm), and finally a sealable film is laminated onto the aluminium foil (or the metallized PET film). The sealable film is usually a polyethylene film (thickness usually from 30 to 140 μm). The walls of the bag are then punched out from this laminate and sealed by means of contact sealing jaws to give the bags, where the polyethylene seals to the polyethylene of another bag wall side. The film of the invention may further be incorporated into packaging, flexible tubing and/or bags, particularly packaging, flexible tubing and/or bags in contact with food, such as animal feed.

Methods

The following measured values were used to characterize the films:

Average Film Thickness

The average thickness $t_F$ is determined from the weight of a film which has known length, width and density. The weight of a film strip of width 80 mm is measured across the entire width of the machine roll (film strip length). After each individual test strip is cut to size, it is weighed on a PM 200 analysis balance from Mettler (maximal loading 200 g). $t_F$ is calculated from the following formula:

$$t_F[\mu m] = \frac{m[g]}{l[mm] \cdot w[mm] \cdot d[g/cm^3]} \cdot 10^{-6}$$

where:
m is mass of film sample tested
l is length of sample
w is width of sample
d is density of material tested (for polyester by way of example 1.395 g/cm³)

The individual film layer thicknesses (outer layer thickness(es) and base layer) are calculated from the formulae below on the basis of the average film thickness $t_F$ with reference to the percentage proportions of the extruder throughput ratios, based on total throughput:

$$x_A = \frac{T_A\left[\frac{kg}{h}\right] \cdot 100}{T_{tot}[kg/h]}$$

$$t_A[\mu m] = \frac{t_F[\mu m] \cdot x_A}{100}$$

$x_A$: percentage proportion of outer layer A
$T_A$: extruder throughput of outer layer A [kg/h]
$T_{tot}$: total extruder throughput [kg/h]
$t_F$: average film thickness [μm]

Density

Film density was determined in accordance with ASTM D1505-68, Method C.

Mechanical Properties

Mechanical properties in longitudinal and transverse direction are determined by way of tensile testing in accordance with DIN EN ISO 572-1 and -3 (sample type 2) on film strips measuring 100 mm×15 mm. Length change is measured by a traverse position sensor. Modulus of elasticity is determined as gradient between 0.2% and 0.3% tensile strain at a tensile velocity of 1 mm/min. The σ5 value (=F5 value, force at 5% tensile strain) is measured with a tensile velocity of 100 mm/min.

Measurement of $d_{50}$ Average Particle Diameter of Inorganic Particles $d_{50}$ average diameter is determined by means of a Malvern MASTERSIZER® 2000 on the particle to be used.

For this, the samples are placed in a cell with water, and the cell is then inserted into the measurement device. A laser is used to analyse the dispersion, and the particle size distribution is determined from the signal via comparison with a calibration curve. The particle size distribution is characterized by two parameters, the median value $d_{50}$ (=indicating the position of the central value), and the scatter, known as SPAN98 (=indicating the scattering of the particle diameter). The measurement procedure is automatic, and also includes mathematical determination of the $d_{50}$ value. The $d_{50}$ value here is defined as determined from the (relative) cumulative particle size distribution curve: the point of intersection of the 50% ordinate with the cumulative curve provides the desired $d_{50}$ value on the abscissa axis.

Measurements on the Film Produced by Using the Said Particles give a (150 value that is lower by from 15 to 25% than that for the particles used.

Measurement of Particle Size of the Coating Dispersion

Particle size in the coating dispersion is measured by means of laser correlation spectroscopy (LCS) with a Coulter N4 Plus at a temperature of 25° C. and at an angle of 90°.

Friction

Friction was determined by a method based on DIN 53375, but with use of a 25 g weight. The resulting value is multiplied by a factor of 8. Friction was measured at least 14 days after production. Blocking occurs when there are discontinuities in the graphic plotting of frictional force against displacement.

Haze and Transparency

The tests serve to determine the haze and transparency of plastics films where optical clarity or haze is significant for functional value. The measurement is made in accordance with ASTM D1003-07 in a HAZE-GARD® PLUS C from BYK Gardner.

Volume Haze

Volume haze is measured by clamping a film sample into a frame, which is immersed in immersion liquid in a cell. The liquid must wet the entirety of both sides of the film sample. The refractive index of the immersion liquid should be from 1.50 to 1.65, and by way of example an immersion oil from Merck, Germany (No. 104699) with refractive index 1.516 was used. The cell with the film sample is placed in the beam path of a haze measurement device, e.g. an XL-221 HAZE-GARD® haze meter from BYK Gardner. The haze value is measured, and the value for the liquid-filled cell without film sample, as zero value, is subtracted therefrom. The resultant value is the volume haze value.

Gloss at 60°

Gloss is determined in accordance with DIN 67530. Reflectance is measured, this being an optical value characteristic of a film surface. Using a method based on the standards ASTM D523-78 and ISO 2813, the angle of incidence is set at 60°. A beam of light hits the flat test surface at the set angle of incidence and is reflected or scattered by the surface. A proportional electrical variable is displayed, representing light rays hitting the photoelectronic detector. The value measured is dimensionless.

Coating Thickness

The coating thickness t is calculated by way of the consumption of coating solution per unit of time while taking into account the stretching factor transverse to the running direction of the film and the coated web width.

$$t = \frac{A_{wet} \cdot \text{solid(wt.} - \%)}{\rho \cdot TD}$$

$A_{wet}$=wet application weight in g/m²
Solid(wt.-%)=solids content in % by weight
$\rho$=density in g/m³
TD=transverse stretching factor Self-Sealing (=FIN Sealing)

Self-sealing was determined by mutually superposing the matt, coated sides of two film strips of width 15 mm and sealing at 180° C. with sealing time 0.5 s and sealing pressure 3 bar (device: Brugger NDS, sealing jaw with single-side heating). Seal seam strength is determined by the T-peel method=2·90°. Under the stated conditions, the film strips are not permitted to exceed a seal seam strength of 0.5 N/15 mm, i.e. are not permitted to seal.

Appearance of Color

Appearance of color is tested by an internal method by using acrylic spray coating material, e.g. CAPALAC® DISCOLOR from Caparol Farben Lacke Bautenschutz GmbH, to color the entire area of the outer layer C on a 10 cm strip of a film sample of A4 size. After drying of the coloured coating, the appearance of colour on the sample is compared visually by a person with the reference film (HOSTAPHAN® MPK12 BOPET film) coloured in the same way, and classified as follows:

colours are just as clear and brilliant as the reference→no significant difference from reference colours are greyer/duller than the reference, and are classified as follows: somewhat duller, very much duller

EXAMPLES

Inventive Examples 1-6 and Comparative Examples 1-7

The polymer mixtures are melted at 292° C. and are electrostatically applied through a flat-film die onto a chill roll, the temperature of which is controlled to 30° C. Under the following conditions, they are then subjected to longitudinal stretching followed by transverse stretching:

| Longitudinal stretching | Heating temperature | 70-115 | ° C. |
|---|---|---|---|
| | Stretching temperature | 115 | ° C. |
| | Longitudinal stretching ratio | 4.0 | |

-continued

| | | | |
|---|---|---|---|
| Transverse stretching | Heating temperature | 105 | ° C. |
| | Stretching temperature | 115 | ° C. |
| | Transverse stretching ratio (inclusive of stretching in 1st setting field) | 4.0 | |
| Setting | Temperature | 237-150 | ° C. |
| | Duration | 4 | s |

The following polymers are used in the examples (according to the invention):

PET1=polyethylene terephthalate made of ethylene glycol and terephthalic acid with SV value 820.

PET2=polyethylene terephthalate made of ethylene glycol and terephthalic acid with SV value 800 and 12 mol % of isophthalic acid as comonomer (based on the dicarboxylic acid units).

PET3=polyethylene terephthalate made of ethylene glycol and terephthalic acid with SV value 450. The polymer comprises 15.0% by weight of SYLOBLOC® 43 silicon dioxide from the producer W.R. Grace & Co., with $d_{50}$ average particle diameter from 3.6 to 4.2 μm and 12 mol % of isophthalic acid as comonomer (based on the dicarboxylic acid units).

PET4=polyethylene terephthalate made of ethylene glycol and terephthalic acid with SV value 790. The polymer comprises 1.5% by weight of SYLOBLOC® 46 silicon dioxide from the producer W.R. Grace & Co., with $d_{50}$ average particle diameter from 2.9 to 3.5 μm.

PET5=polyethylene terephthalate made of ethylene glycol and terephthalic acid with SV value 450. The polymer comprises 15.0% by weight of SYLOBLOC® 43 silicon dioxide from the producer W.R. Grace & Co., with $d_{50}$ average particle diameter from 3.6 to 4.2 μm.

PET6=polyethylene terephthalate made of ethylene glycol and terephthalic acid with SV value 800 and 34 mol % of isophthalic acid (based on the dicarboxylic acid units) as comonomer.

PET7=polyethylene terephthalate made of ethylene glycol and terephthalic acid with SV value 450. The polymer comprises 15.0% by weight of SYLOBLOC® 43 silicon dioxide from the producer W.R. Grace & Co., with $d_{50}$ average particle diameter from 3.6 to 4.2 μm and 34 mol % of isophthalic acid as comonomer (based on the dicarboxylic acid units).

In accordance with the data in Table 1, the film was coated by the process described above with an ESACOTE® PU900 PU coating from Lamberti S.p.A.

Table 1 below collates the formulations and resultant film properties:

TABLE 1

| | | Inv. Ex. 1 | Inv. Ex. 2 | Inv. Ex. 3 | Inv. Ex. 4 | Inv. Ex. 5 | CE1 |
|---|---|---|---|---|---|---|---|
| Layer | Total film thickness [μm] | 12 | 12 | 12 | 12 | 12 | 12 |
| | Thickness of A | 1.2 | 1.2 | 1.2 | 1.2 | 1.2 | 1.2 |
| | Thickness of B | 9.6 | 9.6 | 9.6 | 9.6 | 9.6 | 9.6 |
| | Thickness of C | 1.2 | 1.2 | 1.2 | 1.2 | 1.2 | 1.2 |
| Coating | Coating thickness [nm] | 90 | 30 | 230 | 90 | 90 | 0 |
| | Solids content of PU component of coating dispersion | 15 | 5 | 30 | 15 | 15 | no coating |
| | Solids content of crosslinking agent, based on solids content of dispersion | 0 | 0 | 0 | 0 | 0.15 | no crosslinking agent |
| Layer A | PET 1 [%] | | | | 65 | | |
| | PET 2 [%] | 65 | 65 | 65 | | 65 | 65 |
| | PET 3 [%] | 35 | 35 | 35 | | 35 | 35 |
| | PET 4 [%] | | | | | | |
| | PET 5 [%] | | | | 35 | | |
| | PET 6 [%] | | | | | | |
| | PET 7 [%] | | | | | | |
| Layer B | PET 1 [%] | 50 | 50 | 50 | 50 | 50 | 50 |
| | PET 2 [%] | | | | | | |
| | PET 3 [%] | | | | | | |
| | PET 4 [%] | | | | | | |
| | PET 5 [%] | | | | | | |
| | PET 6 [%] | | | | | | |
| | PET 7 [%] | | | | | | |
| | Self-regrind [%] | 50 | 50 | 50 | 50 | 50 | 50 |
| Layer C | PET 1 [%] | 95 | 95 | 95 | 95 | 95 | 95 |
| | PET 2 [%] | | | | | | |
| | PET 3 [%] | | | | | | |

TABLE 1-continued

|  | | | | | | | |
|---|---|---|---|---|---|---|---|
| | PET 4 [%] | 5 | 5 | 5 | 5 | 5 | 5 |
| | PET 5 [%] | | | | | | |
| | PET 6 [%] | | | | | | |
| | PET 7 [%] | | | | | | |
| Gloss of layer C, measured at 60° | | 35 | 43 | 17 | 47 | 36 | 45 |
| Transparency (centre of web) | in % | 91.5 | 91 | 91.8 | 89.9 | 91.6 | 91.4 |
| Haze | | 41 | 39 | 48 | 42 | 42 | 38 |
| Static COF, side A/side A | | 0.80 | 0.45 | 1.50 | 0.42 | 0.65 | 0.31 |
| Volume haze | in % | 6.2 | 5.8 | 6.9 | 26.7 | 6.8 | 5.1 |
| Modulus of elasticity in MD | N/mm2 | 4098 | 4126 | 4189 | 4156 | 4135 | 4125 |
| Modulus of elasticity in TD | N/mm2 | 4921 | 5069 | 4907 | 4924 | 4886 | 4957 |
| F5 in MD | N/mm2 | 98 | 97 | 98 | 98 | 99 | 98 |
| F5 in TD | N/mm2 | 99 | 95 | 98 | 97 | 96 | 97 |
| Processability | | good | good | good | good | good | good |
| Self-sealing, side A/side A at sealing temperature 180° C., 0.5 s sealing time | | no | no | no | no | no | no |
| Appearance of colour | | no significant difference from reference | no significant difference from reference | somewhat duller than reference | very much duller than reference | no significant difference from reference | reference |
| Evaluation | | very good COF increase with low film gloss | slight COF increase with moderate film gloss | very good COF increase, appearance of colour somewhat poorer than Inv. Ex. 1 | very good COF increase, appearance of colour somewhat poorer than Inv. Ex. 1 | good COF increase with low film gloss | COF too low |

| | | CE2 | CE3 | CE4 | CE5 | CE6 |
|---|---|---|---|---|---|---|
| Layer | Total film thickness [μm] | 12 | 12 | 12 | 12 | 12 |
| | Thickness of A | 1.2 | 2.5 | 1.2 | 1.2 | 0.5 |
| | Thickness of B | 9.6 | 8.3 | 9.6 | 9.6 | 10.3 |
| | Thickness of C | 1.2 | 1.2 | 1.2 | 1.2 | 1.2 |
| Coating | Coating thickness [nm] | 0 | 89 | 589 | 90 | 92 |
| | Solids content of PU component of coating dispersion | no coating | 15 | 30 | 15 | 15 |
| | Solids content of crosslinking agent, based on solids content of dispersion | no crosslinking agent | 0 | 0 | 0 | 0 |

TABLE 1-continued

| | | | | | | | |
|---|---|---|---|---|---|---|---|
| Layer A | PET 1 [%] | 98 | | | | | |
| | PET 2 [%] | | 65 | 65 | | 65 | |
| | PET 3 [%] | | 35 | 35 | | 35 | |
| | PET 4 [%] | 2 | | | | | |
| | PET 5 [%] | | | | | | |
| | PET 6 [%] | | | | 65 | | |
| | PET 7 [%] | | | | 35 | | |
| Layer B | PET 1 [%] | 50 | 50 | 50 | 50 | 50 | |
| | PET 2 [%] | | | | | | |
| | PET 3 [%] | | | | | | |
| | PET 4 [%] | | | | | | |
| | PET 5 [%] | | | | | | |
| | PET 6 [%] | | | | | | |
| | PET 7 [%] | | | | | | |
| | Self-regrind [%] | 50 | 50 | 50 | 50 | 50 | |
| Layer C | PET 1 [%] | 86 | 95 | 95 | 95 | 95 | |
| | PET 2 [%] | | | | | | |
| | PET 3 [%] | | | | | | |
| | PET 4 [%] | 14 | 5 | 5 | 5 | 5 | |
| | PET 5 [%] | | | | | | |
| | PET 6 [%] | | | | | | |
| | PET 7 [%] | | | | | | |
| Gloss of layer C, measured at 60° | | 174 | 20 | 15 | 33 | 54 | |
| Transparency (centre of web) | in % | 92.2 | 89.1 | 93.9 | 92.1 | 91.8 | |
| Haze | | 1.6 | 65 | 62 | 41 | 27 | |
| Static COF, side A/side A | | discontinuities in COF >> 1.6 | 0.55 | discontinuities | 0.78 | 0.95 | |
| Volume haze | in % | 1.5 | 14.7 | 8.4 | 1.2 | 3.5 | |
| Modulus of elasticity in MD | N/mm2 | 4119 | 4089 | 4168 | 4137 | 4156 | |
| Modulus of elasticity in TD | N/mm2 | 4945 | 5021 | 4978 | 4956 | 4957 | |
| F5 in MD | N/mm2 | 107 | 100 | 99 | 98 | 105 | |
| F5 in TD | N/mm2 | 98 | 97 | 97 | 99 | 99 | |
| Processability | | film tends to block on machine parts during subsequent processing | good | film sticks on machine parts during subsequent processing | film sticks on machine parts during subsequent processing | good | |
| Self-sealing, side A/side A at sealing temperature 180° C., 0.5 s sealing time | | no | no | yes | yes | no | |
| Appearance of colour | | clearer than reference | very much duller than reference | very much duller than reference | clearer than reference | no significant difference from reference | |
| Evaluation | | film too glossy | appearance of colour unsatisfactory | appearance of colour unsatisfactory, poor FIN-sealing properties | poor FIN-sealing properties | gloss too high | |

That which is claimed:

1. An at least two-layer biaxially oriented polyester film comprising a polyurethane-based coating on at least one film surface at outer layer A, wherein (a) the total film thickness is from 8 to 75 μm;

(b) outer layer A comprises particles with $d_{50}$ from 2.0 μm to 10 μm, thereby rendering the outer layer (A) into a matt outer layer (A);

(c) the polyurethane-based coating is a dried aqueous dispersion;
(d) the aqueous coating dispersion has been applied to the matt outer layer (A;
(e) the aqueous coating dispersion comprises spherical particles with average particle size ≥0.6 μm and
(f) the dried coating has a dry layer thickness of from 20 nm to 250 nm.

2. The polyester film according to claim 1, wherein the polyurethane-based coating comprises spherical particles with average particle size ≥0.6 μm, these particles comprising at least one anionic polyurethane.

3. The polyester film according to claim 2, wherein the anionic polyurethane of the particles is formed by the reaction of at least one
   (1a) anionic prepolymer having from 5 to 25 meq/100 g dry-matter content of carboxy groups
   with at least one
   (1b) chain extender selected from diamine sulfonate salts having one or more sulfonic acid groups.

4. Film according to claim 1, wherein the polyurethane-based coating dispersion additionally comprises a proportion of ≤2.0% by weight of a crosslinking agent.

5. Film according to claim 4, wherein the crosslinking agent is oxazoline-based or silane-based.

6. Film according to claim 1, wherein the matt outer layer (A) comprises a quantity of from 2% by weight to 7% by weight of silicon dioxide particles.

7. Film according to claim 1, wherein the biaxially oriented polyester film has a three-layer (A, B, C) structure, the said three-layer film having the matt outer layer (A) on one side of a base layer (B) and an outer layer (C) on the other side of the base layer (B).

8. Film according to claim 7, where the outer layer (C) comprises a quantity of from 500 to 4000 ppm of particles with a $d_{50}$ diameter from 2.0 to 5 μm.

9. Film according to claim 7, where the film comprises up to 60% by weight of recycled polyester polymer in the base layer (B).

10. Film according to claim 1, wherein the matt outer layer (A) has a thickness of at least 0.7 μm and at most 2.0 μm.

11. Film according to claim 1, wherein the matt outer layer (A) comprises from 4 to 30 mol % of units derived from isophthalic acid (IPA).

12. A process for the production of the at least two-layer biaxially oriented polyester film according to claim 1, comprising
   melting polyester raw material(s) for the polyester film layers in two or more extruders;
   extruding the melted polyester through a flat-film die onto a take-off roll; and
   taking off the extruded polyester and then subjecting the extruded polyester to simultaneous or sequential longitudinal and transverse stretching, heat fixing, and winding up,
      wherein a polyurethane-based coating comprising spherical particles with average particle size ≥0.6 μm is applied to a surface of the film, said particles comprising at least one anionic polyurethane formed by reaction of at least one
      (1a) anionic prepolymer having from 5 to 25 meq/100 g dry-matter content of carboxy groups
      with at least one
      (1b) chain extender selected from diamine sulfonate salts having one or more sulfonic acid groups.

13. Packaging, flexible tubing and/or bags comprising the film of claim 1.

14. Packaging, flexible tubing and/or bags according to claim 13, wherein the bags are animal-feed bags.

15. Packaging, flexible tubing and/or bags according to claim 13, wherein the packaging, flexible tubing and/or bags contacts food.

16. An at least two-layer biaxially oriented polyester film, wherein
   a) the gloss at 60° of at least one of the film's two surfaces, outer layer A, is at most 50 and at least 10, and
   b) the outer layer A has a coefficient of friction (COF) of from 0.4 to 1.6,
      and also
   c) up to at least 180° C., said outer layer A does not seal on contact to itself (matt on matt),
   and the film has
   d) haze below 60%,
   e) volume haze below 40%,
   f) modulus of elasticity above 3000 N/mm$^2$,
   and
   g) F5 value above 80 N/mm$^2$.

* * * * *